United States Patent Office 2,901,489
Patented Aug. 25, 1959

2,901,489

SUBSTITUTED PYRROLES

George Allen, Jr., Paramus, and John S. Webb, Woodcliff Lake, N.J., assignors to American Cyanamid Company, New York, N.Y., a corporation of Maine No Drawing. Application December 4, 1956
Serial No. 626,082

8 Claims. (Cl. 260—326.3)

This invention relates to new organic compounds. More particularly, it relates to acylaminopyrroles.

The new compounds of the present invention can be illustrated by the following general formula:

$$X-NHCH_2\underset{\underset{O}{\|}}{C}-NH-\underset{\underset{R_1}{|}}{\underset{N}{\bigcirc}}\underset{R_3}{\overset{R_2}{\underset{C-Z}{\underset{\|}{O}}}}$$

in which $R_1$, $R_2$, and $R_3$ are members of the group consisting of hydrogen and lower alkyl radicals, X is a member of the group consisting of hydrogen and an amidino radical, and Z is a member of the group consisting of lower alkoxy, amino, and omega-carbamoyl loweralkyl amino radicals and salts thereof.

The present compounds are usually crystalline in structure and often have relatively high melting points. The salts, in general, are insoluble in organic solvents and relatively soluble in water.

The compounds of the present invention, in general, are prepared by a method which includes the removal of the carbobenzoxy group from the corresponding carbobenzoxy (amino-acetamido)-pyrroles.

This reaction can be illustrated by the following equation:

$$\bigcirc-CH_2O\underset{\underset{O}{\|}}{C}NHCH_2\underset{\underset{O}{\|}}{C}NH-\underset{\underset{R_1}{|}}{\underset{N}{\bigcirc}}\underset{R_3}{\overset{R_2}{\underset{C-Z}{\underset{\|}{O}}}} \longrightarrow$$

$$\bigcirc-CH_2R + H_2NCH_2\underset{\underset{O}{\|}}{C}NH-\underset{\underset{R_1}{|}}{\underset{N}{\bigcirc}}\underset{R_3}{\overset{R_2}{\underset{C-Z}{\underset{\|}{O}}}} + CO_2$$

in which R is hydrogen or bromine and $R_1$, $R_2$, and $R_3$ are members of the group consisting of hydrogen and lower alkyl radicals and Z is a member of the group consisting of lower alkoxy, amino and omega-carbamoyl loweralkylamino radicals. The compounds of the present invention containing basic groups are capable of forming acid salts which are intended to be included within the scope of the present invention. The carbobenzoxy group can be removed by several methods, two of which have been found particularly useful. The first method is catalytic hydrogenation at room temperature using a catalyst such as palladium. The second method is cleavage using a solution of anhydrous hydrogen bromide in glacial acetic acid. Following removal of the carbobenzoxy group, the (aminoacetamido)-pyrrole can be reacted with cyanamide or other guanylating agents to produce the corresponding (guanidinoacetamido)-pyrrole, which is also described in the examples hereinafter.

The starting material for the compounds of the present invention can be prepared by the addition of an alkyl chlorocarbonate to a solution of triethylamine and carbobenzoxyglycine in an inert solvent. The combination of the latter two compounds produces a triethylamine salt, which reacts with the alkyl chlorocarbonate to form a reactive mixed carbonic anhydride and triethylamine hydrochloride. The anhydride is then treated with an aminopyrrole and the desired intermediate purified by means well known to those skilled in the art.

The compounds of the present invention inhibit the growth of bacteria and fungi. For example, they are effective against mycobacterium S.P. 607, *Sarcina lutea*, *Hormodendrum cladosporoides*, streptococcus at 1 mg./ml. or less. They are, therefore, useful as antibacterial agents or antifungal agents. They can be used as a dusting powder or in solution.

The following examples illustrate the preparation of the compounds of the present invention in greater particularity.

Example 1

A mixture of 2.0 g. (5.0 millimoles) beta-[4-(carbobenzoxyaminoacetamido) - 1 - methyl - 2 - pyrrolecarboxamido]-propionamide, 1.0 g. 10% palladium or charcoal catalyst, 1 ml. water, and 50 ml. methyl alcohol was shaken under an atmosphere of hydrogen in the Parr low pressure apparatus during one-half hour. The mixture was filtered, and the filtrate was treated with 1 ml. glacial acetic acid and concentrated on the steam bath at atmospheric pressure to leave a yellow glass. This was dissolved in 10 ml. hot ethyl alcohol and allowed to cool. The solid that separated was collected by filtration and dried to give 1.5 g. pale yellow solid, melting point 173°–176° C. Recrystallization from ethyl alcohol gave beta-[4 - (aminoacetamido) - 1 - methyl - 2 - pyrrolecarboxamido]-propionamide acetate, a white solid, melting point 175°–177° C.

*Analysis.*—Calc'd. for $C_{11}H_{17}N_5O_3 \cdot HC_2H_3O_2$: C, 47.7; H, 6.55; N, 21.4. Found: C, 46.9; H, 6.44; N, 21.1.

Example 2

A solution of 2.0 g. (5.6 millimoles) ethyl 4-(carbobenzoxyaminoacetamido) - 1 - methyl - 2 - pyrrolecarboxylate in 100 ml. glacial acetic acid saturated with dry hydrogen bromide was allowed to stand four hours at room temperature. Anhydrous ether (100 ml.) was added, and the mixture was chilled. The precipitated solid was collected by filtration and dried to give 1.0 g. white solid, melting point 266.0–267.5° C. (dec.) darkening from 250° C. Recrystallization from acetic acid-ether gave white crystals of ethyl 4-(aminoacetamido)- 1 - methyl - 2 - pyrrolecarboxylate hydrobromide, melting point 267°–268° C. (dec.).

*Analysis.*—Calc'd. for $C_{10}H_{15}N_3O_3 \cdot HBr$: C, 39.2; H, 5.26; N, 13.7. Found: C, 39.1; H, 5.35; N, 13.7.

Example 3

The following compounds were prepared by the method of Example 2:

| Name | Empirical Formula | Recrystallization Solvent | Percent Yield | Melting Point (° C.) | Analysis C Calcd. | C Found | H Calcd. | H Found | N Calcd. | N Found |
| --- | --- | --- | --- | --- | --- | --- | --- | --- | --- | --- |
| 4-(aminoacetamido)-2-pyrrole-carboxamide hydrobromide. | $C_7H_{10}N_4O_2 \cdot HBr$ | Acetone-water | 87 | 300–302 (dec.) | 31.9 | 31.9 | 4.22 | 4.44 | 21.3 | 21.2 |
| Beta-[4-(aminoacetamido)-1-methyl-2-pyrrolecarboxamido]-propionamide hydrobromide. | $C_{11}H_{17}N_5O_3 \cdot HBr$ | Ether-methanol | 80 | 159.0–160.5 | 38.0 | 37.8 | 5.31 | 5.20 | 23.0 | 22.8 |
| Ethyl 4-(aminoacetamido)-1,3,5-trimethyl-2-pyrrolecarboxylate hydrobromide. | $C_{12}H_{18}N_3O_3 \cdot HBr$ | Water | 69 | 296–297 (dec.) | 43.1 | 42.9 | 6.06 | 5.85 | 12.6 | 12.4 |
| 4-(aminoacetamido)-1-methyl-2-pyrrolecarboxamide hydrobromide. | $C_8H_{12}N_4O_2 \cdot HBr \cdot H_2O$ | Methanol-ether | 40 | 264–265 (dec.) | 32.5 | 32.3 | 5.04 | 5.06 | 19.0 | 19.3 |
| Ethyl 4-(aminoacetamido)-2-pyrrolecarboxylate hydrobromide. | $C_9H_{13}N_3O_3 \cdot HBr$ | do | 93 | 224.5–226.0 (dec.) | 37.0 | 37.2 | 4.83 | 4.91 | 14.4 | 14.2 |

Example 4

A suspension of 3.0 g. (0.010 mole) ethyl 4-(aminoacetamido)-1-methyl-2-pyrrolecarboxylate hydrobromide and 5.0 g. (0.030 mole) 25% aqueous cyanamide in 5 ml. water was buffered to pH 8.7 with concentrated aqueous ammonia. The resulting yellow solution was allowed to stand at room temperature for 7½ days. At the end of this time some solid had precipitated from the now dark-brown solution. The solvent was removed in a current of air, and the residue was triturated with 5 ml. acetone, removed by filtration, and dried to give 2.3 g. (63%) yield tan solid, melting point 189°–193° C. (dec.). Purification by dissolution in methanol, clarification with activated charcoal, filtration, chilling, and dilution with anhydrous ether gave ethyl 4-(guanidinoacetamido)-1-methyl-2-pyrrolecarboxylate hydrobromide as a white solid, melting point 199°–201° C. (dec.).

*Analysis.*—Calc'd. for $C_{11}H_{17}N_5O_3 \cdot HBr$: C, 37.9; H, 5.20; Br, 23.0; N, 20.1. Found: C, 38.2; H, 5.35; Br, 23.1; N, 20.2. This material formed a yellow picrate, melting point 216.0°–217.5° C. (dec.).

*Analysis.*—Calc'd. for $C_{11}H_{17}N_5O_3 \cdot C_6H_3N_3O_7$: C, 41.1; H, 4.07; N, 22.6. Found: C, 40.9; H, 4.13; N, 22.4.

Example 5

A solution of 1.0 g. (3.3 millimoles) ethyl 4-(aminoacetamido-2-pyrrolecarboxylate hydrobromide and 1.0 g. (6.0 millimoles) 25% aqueous cyanamide in 3 ml. water was buffered to pH 8.8 with concentrated ammonium hydroxide solution and allowed to stand six days at room temperature. The dark solution was clarified with activated charcoal, and the resulting pale-yellow solution was taken to an oily residue under reduced pressure on the steam bath. The residue was triturated with ethanol, and the solid removed by filtration. The alcohol was removed from the filtrate to give ethyl-4-(guanidinoacetamido)-2-pyrrolecarboxylate hydrobromide as an oil.

Example 6

A solution of 0.50 g. (1.5 millimoles) beta-[4-(aminoacetamido)-1-methyl-2-pyrrolecarboxamido]-propionamide acetate and 1.0 g. (6.0 millimole) 25% aqueous cyanamide in 2 ml. water was buffered to pH 8.7 with concentrated ammonium hydroxide and allowed to stand for eight days. Removal of the water gave beta-[4-(guanidinoacetamido)-1-methyl-2-pyrrolecarboxamido]-propionamide acetate.

Example 7

A solution of 500 mgm. (1.90 millimoles) 4-aminoacetamido)-2-pyrrolecarboxamide hydrobromide and 1.0 g. (6.0 millimoles) 25% aqueous cyanamide in 2 ml. water was buffered to pH 8.8 with concentrated aqueous ammonia and allowed to stand five days at room temperature. The solution was concentrated in a current of air to give a dark residue, which was dissolved in 20 ml. methanol, decolorized with activated charcoal, and filtered. The filtrate was treated with picric acid to give 200 mgms. of 4-(guanidinoacetamido)-2-pyrrolecarboxamide picrate, orange crystals, melting point greater than 240° C. after recrystallization from dilute alcohol.

*Analysis.*—Calc'd. for $C_8H_{12}N_6O_2 \cdot C_6H_3N_3O_7$: C, 37.0; H, 3.33; N, 27.8. Found: C, 36.5; H, 3.46; N, 27.7.

Example 8

A suspension of 140 mgms. (0.42 millimole) ethyl 4-(aminoacetamido)-1,3,5-trimethyl-2-pyrrolecarboxylate hydrobromide and 0.5 g. (3 millimoles) 25% aqueous cyanamide in 2 ml. water was adjusted to pH 8.8 with concentrated aqueous ammonia. Most of the solid dissolved, and the mixture was allowed to stand at room temperature for 11 days. The solid was collected by filtration and dried to give 80 mgms. ethyl 4-(guanidinoacetamido)-1,3,5-trimethyl-2-pyrrolecarboxylate hydrobromide, a solid melting at 183°–187° C. (dec.).

A portion of this solid was treated with aqueous picric acid and gave a yellow picrate, melting point 212°–215° C. (dec.) and darkening from 205° C. A mixture with the picrate described in the following example showed identical melting point behavior.

Example 9

A solution of 2.53 g. (0.010 mole) ethyl 4-(aminoacetamido)-1,3,5-trimethyl-2-pyrrolecarboxylate in 10 ml. water was treated with 2.0 g. (0.010 mole) 1-guanyl-3,5-dimethylpyrazole nitrate in 10 ml. water. The solution was allowed to reflux during 24 hours. The solution was extracted with ether and then concentrated in a current of air to ca. one-half volume. The solid that separated was collected by filtration and recrystallized from methanol-ether to give 2.5 g. (67% yield) of ethyl 4-(guanidinoacetamido)-1,3,5-trimethyl-2-pyrrolecarboxylate nitrate hydrate as a white solid, melting point 168°–170° C.

*Analysis.*—Calc'd. for $C_{13}H_{21}N_5O_3 \cdot HNO_3 \cdot H_2O$: C, 41.6; H, 6.44; N, 22.3; $H_2O$, 4.78. Found: C, 42.0; H, 6.11; N, 22.3; $H_2O$, 4.71. Upon treatment with picric acid, this material furnished a yellow picrate, melting point 213.0°–215.5° C. (dec.), which darkened from 207° C.

*Analysis.*—Cal'cd. for $C_{13}H_{21}N_5O_3 \cdot C_6H_3N_3O_7$: N, 21.4. Found: N, 21.0.

Example 10

A solution of 1.96 g. (0.010 mole) 4-(aminoacetamido)-1-methyl-2-pyrrolecarboxamide in 15 ml. methanol was allowed to reflux with 2.0 g. (0.010 mole) 1-guanyl-3,5-dimethylpyrazole nitrate in 10 ml. water for 21 hours. The solution was concentrated to ca. 7 ml. in a current of air, diluted to ca. 20 ml. with water, and thrice extracted with 20 ml. ether. The aqueous phase was concentrated to a viscous orange oil in a current of air. Trituration with hot methanol caused the oil to crystallize. The hot mixture was chilled and filtered to give a tan solid, 4-(guanidinoacetamido)-1-methyl-2-pyrrolecarboxamide nitrate hydrate, melting point 127°–132° C. Two recrystallizations from methanol - ether - water (15:30:1) gave 500 mgm. of white crystals, melting point 142°–144° C. after sintering at 60° C.

*Analysis.*—Calc'd for $C_9H_{14}N_2O_2 \cdot HNO_3 \cdot H_2O$: C, 33.9; H, 5.36; N, 30.4; $H_2O$, 5.65. Found: C, 33.7; H, 5.44; N, 30.6; $H_2O$, 5.46.

We claim:

1. A compound selected from the group consisting of those having the formula

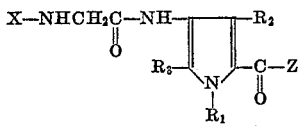

in which $R_1$, $R_2$ and $R_3$ are members of the group consisting of hydrogen and lower alkyl radicals, X is a member of the group consisting of hydrogen and the amidino radical, and Z is a member of the group consisting of lower alkoxy, amino, and omega-carbamoyl lower-alkyl amino radicals and acid addition salts of the group consisting of acetate, hydrobromide, picrate, and nitrate salts.

2. A lower alkyl 4-aminoacetamido)-1,3,5-trilower alkyl-2-pyrrolecarboxylate acid addition salt of the group consisting of acetate, hydrobromide, picrate, and nitrate salts.

3. A lower alkyl 4-(guanidinoacetamido)-1-lower alkyl 2-pyrrolecarboxylate acid addition salt of the group consisting of acetate, hydrobromide, picrate, and nitrate salts.

4. Ethyl 4-(aminoacetamido)-1,3,5-trimethyl - 2 - pyrrolecarboxylate hydrobromide.

5. Ethyl 4 - (aminoacetamido)-1-methyl-2-pyrrolecarboxylate hydrobromide.

6. Ethyl 4 - (guanidionacetamido)-1-methyl-2-pyrrolecarboxylate hydrobromide.

7. 4-(guanidinoacetamido) - 1 - methyl - 2 - pyrrolecarboxamide nitrate hydrate.

8. 4-(guanidinoacetamido) - 2 - pyrrolecarboxamide hydrobromide.

References Cited in the file of this patent
UNITED STATES PATENTS

| | | |
|---|---|---|
| 2,785,181 | Waller et al. | Mar. 12, 1957 |
| 2,785,182 | Waller et al. | Mar. 12, 1957 |
| 2,785,183 | Waller et al. | Mar. 12, 1957 |
| 2,797,228 | Webb et al. | June 25, 1957 |